Aug. 14, 1956     R. A. SHAW     2,758,869

LIFTING DEVICE FOR STORAGE BIN

Filed Oct. 19, 1953

*INVENTOR.*
RICHARD A. SHAW
BY
*Barlow & Barlow*
ATTORNEYS

United States Patent Office 2,758,869
Patented Aug. 14, 1956

2,758,869

LIFTING DEVICE FOR STORAGE BIN

Richard A. Shaw, Greenville, R. I., assignor to Stackbin Corporation, a corporation of Rhode Island Application October 19, 1953, Serial No. 386,972

3 Claims. (Cl. 294—108)

This invention relates to the conveying of storage bins from one position to another and particularly to a lifting device for supporting the storage bin for movement along a conveying rail.

One of the objects of this invention is to provide a device which may engage the opposite sides of a storage bin so as to lift the same and serve to retain the bin while conveyed along a track of a conveyer system from one position to another.

Another object of this invention is to provide a lifting device which may be utilized for different size bins.

Another object of this invention is to provide a lifting device which will remain in locked position once moved to such locked position.

Another object of this invention is to provide a device which will be simple and easy to operate.

With these and other objects in view, the invention consists of certain novel features of construction as will be more fully described and particularly pointed out in the appended claims.

Figure 1:
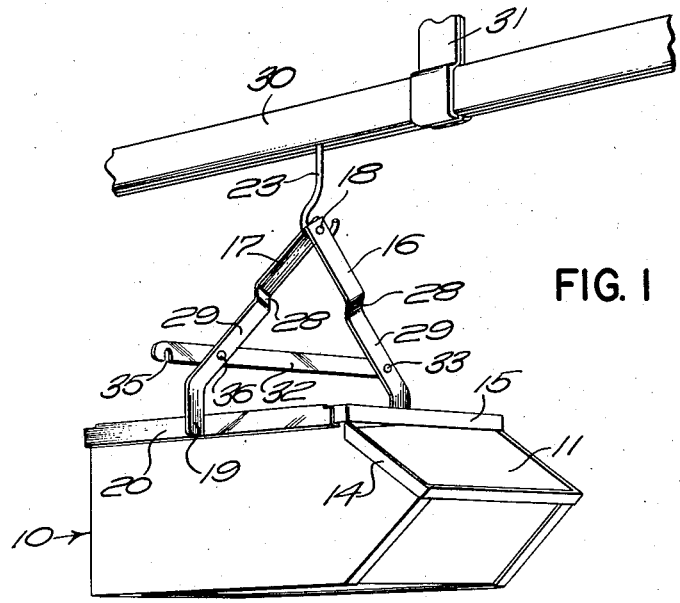
Figure 1 is a perspective view of my lifting device shown in locked position upon a storage bin with the lifting device and the bin suspended from a conveyer track.

In proceeding with this invention, I provide a pair of arms at one end and provide a bar at the other end extending generally at right angles to the plane of the arms, each bar having lips turned inwardly providing flanges which will extend beneath shoulders of the storage bin to engage the same when the arms are brought toward each other for lifting the bin upwardly from its support. The arms may be locked in the position for gripping the bin so that they cannot spread while the lifting device is being moved with the bin along a conveying rail.

With reference to the drawings, the storage bin is designated generally 10 and has an open hopper front 11 with the side walls 12 of the bin deflected inwardly and outwardly so as to provide shoulders 13 (Fig. 4) extending along the sides of the bin. The stock about the opening 11 may be bent back on itself as at 14, and a cross bar at the front edge 15 may extend from one side to the other.

In order to lift this bin, the shoulders 13 are engaged for this purpose. Arms 16 and 17, which are of substantially duplicate shape, are arranged in opposed relation and pivoted at their upper ends as at 18. The lower end 19 of each arm is equipped with a bar 20 which is of angle iron formation and is L-shaped in cross section, there being a portion 21 extending vertically and a portion 22, which serves as a flange, extending inwardly. This flange portion 22 is of a sufficient extent to extend beneath the shoulders 13 and provide a gripping relation therewith. A hook 23 supports the arms by engagement with the pivot 18 between the arms. This pivot 18 is headed over as at 27 to prevent its being dislodged from the pivotal connection. The hook extends between the arms 16 and 17 so as to be in a well balanced relation therewith, while the arms are off-set as at 28 toward each other so that their portions 29 are in substantially the same plane, the off-set being substantially the distance that the arms are apart by reason of the hook 23 being located between them. This hook 23 is equipped with rollers which engage the track 30 which in turn is supported at 31 from some overhead support.

Figures 2, 3, 4:
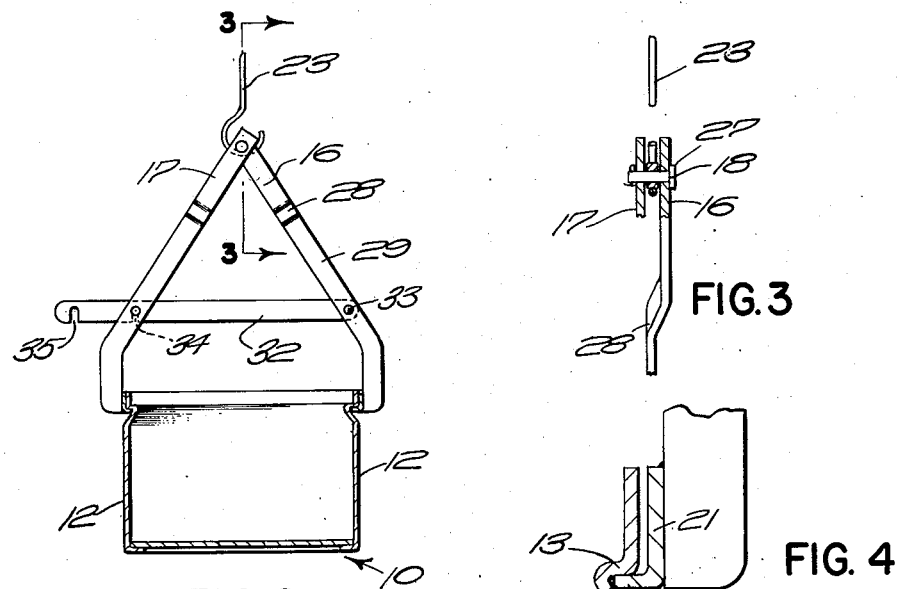
Figure 2 is a sectional view.
Figure 3 is a section on line 3—3 of Figure 2.
Figure 4 is an enlarged fragmental sectional view showing in greater detail the gripping of the bin by the lifting device.

In order to lock the arms in bin engaging position, locking member 32 is pivoted as at 33 to the arm 16 and is provided with notches 34 and 35 in such position that when the arms are in engagement with a storage bin of the size shown in Figure 2, the notch 34 may slip over a headed pin 36 so as to prevent the arms from spreading and dropping the box, or when a larger box is utilized, the notch 35 may be similarly engaged to perform the same function of preventing the spreading of the arms and detachment from the storage bin.

In some cases where it is desirable that the bars 20 be positioned at a certain location on the bin 10, the bars may be notched so that they will fit parts of the bin for location of these bars in such fixed position on the bin.

I claim:

1. A lifting device for a storage bin or the like having shoulders along its opposite sides comprising a pair of arms pivoted together at their upper ends and spaced from each other adjacent the pivot, bars at the lower ends of said arms with inwardly extending flanges to extend beneath said shoulders to obtain a grip thereon for lifting the bin, and a hook extending in the space between said arms and detachably engaged with said pivot to suspend said device when lifting and transporting a bin.

2. A lifting device for a storage bin or the like having shoulders along its opposite sides comprising a pair of arms pivoted together at their upper ends and spaced from each other adjacent the pivot, bars at the lower ends of said arms with inwardly extending flanges to extend beneath said shoulders to obtain a grip thereon for lifting the bin, a hook extending in the space between said arms and engaged with said pivot to suspend said device when lifting and transporting said bin, and a locking member pivoted to one of said arms and having detachable locking engagement with the other arm to hold said arms against spreading.

3. A lifting device for a storage bin or the like having shoulders along its opposite sides comprising a pair of arms pivoted together at their upper ends and spaced from each other adjacent the pivot, bars at the lower ends of said arms with inwardly extending flanges to extend beneath said shoulders to obtain a grip thereon for lifting the bin, a hook extending in the space between said arms and engaged with said pivot to suspend said device when lifting and transporting said bin, one of said arms having a projection thereon, and a locking member pivoted to the other of said arms and having notches to provide selectable detachable locking engagement with said projection to hold the arms against spreading.

References Cited in the file of this patent

UNITED STATES PATENTS

| | | |
|---|---|---|
| 1,484,222 | Kightlinger | Feb. 19, 1924 |
| 1,573,263 | Madden | Feb. 16, 1926 |
| 2,511,142 | Zwoboda et al. | June 13, 1950 |